Oct. 23, 1956 B. W. RISINGER 2,768,238

AUTOMATIC SIGNALING DEVICE

Filed March 17, 1952 3 Sheets-Sheet 1

INVENTOR.
B. W. RISINGER
BY Albert H. Kirchner
ATTORNEY

Oct. 23, 1956 B. W. RISINGER 2,768,238

AUTOMATIC SIGNALING DEVICE

Filed March 17, 1952 3 Sheets-Sheet 2

INVENTOR.
B. W. RISINGER
BY Albert H. Kirchner
ATTORNEY

Oct. 23, 1956 B. W. RISINGER 2,768,238

AUTOMATIC SIGNALING DEVICE

Filed March 17, 1952 3 Sheets-Sheet 3

INVENTOR.
B. W. RISINGER
BY Albert H. Kirchner
ATTORNEY

United States Patent Office 2,768,238

Patented Oct. 23, 1956

2,768,238

AUTOMATIC SIGNALING DEVICE

Ben W. Risinger, Dallas, Tex.

Application March 17, 1952, Serial No. 276,988

12 Claims. (Cl. 179—5)

This invention relates to automatic alarm and other signaling devices, and more particularly it is concerned with providing a novel alarm or analogous device which can be connected to any conventional automatic telephone system with exceptional ease and simplicity.

Various types of automatic signaling apparatus for transmitting alarms to a central receiving station have been heretofore developed for attachment to automatic telephone systems.

Most of these devices, however, had to be affixed directly to the telephone instrument itself, so that, in addition to being unsightly, they made the instrument cumbersome and bulky and a source of annoyance to those using it, and their operation and maintenance became increasingly complex. Moreover, such devices required major alterations to change the numbers they were constructed to dial. These and other defects and deficiencies discouraged manufacture and widespread adoption.

It is a primary object of this invention to provide a novel automatic signaling device which can be conveniently attached to a conventional dial or automatic telephone circuit without the simultaneous attachment thereof to the instrument proper.

A further object of the invention is to provide a novel automatic signaling apparatus which in and of itself is capable of dialing a central station, such as a fire house, after which a coded message identifying the calling station is transmitted by the alarm device to the central station.

A further object of this invention is to provide a novel automatic signaling apparatus which is exceptionally simple to operate, and which in turn is comprised of a minimum number of parts to insure inexpensive manufacture and maintenance.

Another object of this invention is to provide a novel compact automatic signaling device which can be easily and conveniently attached to any conventional dial or automatic telephone circuit without defacing the existing equipment or impairing normal operation and use of it in any way.

A further object of this invention is to provide a novel automatic signaling apparatus which can be conveniently and easily connected across any existing burglar alarm system or temperature responsive device, so that upon actuation thereof the circuit to the automatic signaling apparatus will be closed and cause the same to operate.

Another object is to provide a device wherein the number to be dialed and the code signal to be given can be easily and quickly changed without requiring the use of any special tools or skill.

These and other objects and advantages will become more apparent from a review of the following detailed description of a preferred embodiment, when taken in conjunction with the appended drawings wherein.

Figure 1:
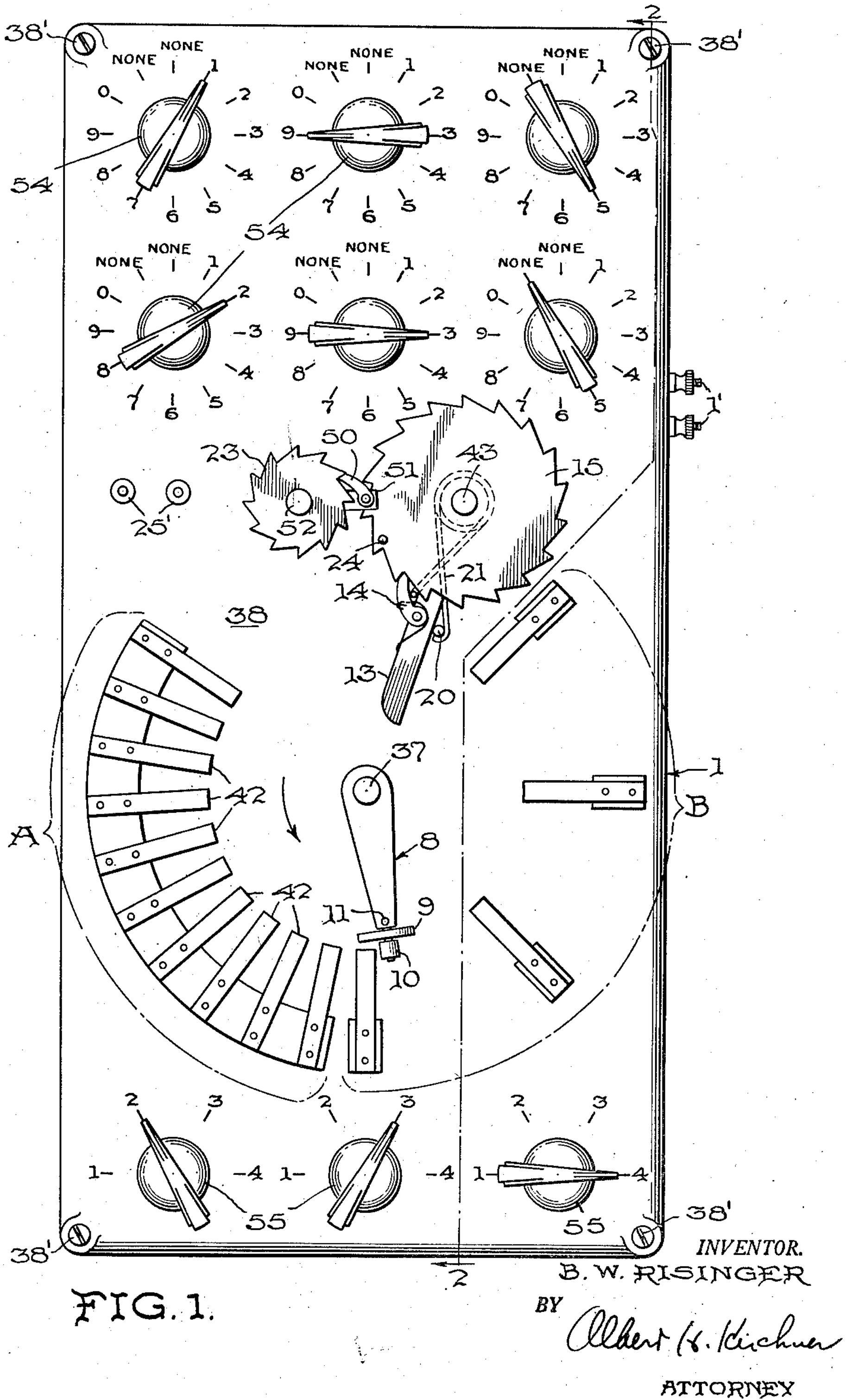
Figure 1 is a plan view of the housing for the alarm device with the various operating dials for the device being indicated on the face panel thereof.
Figure 2:
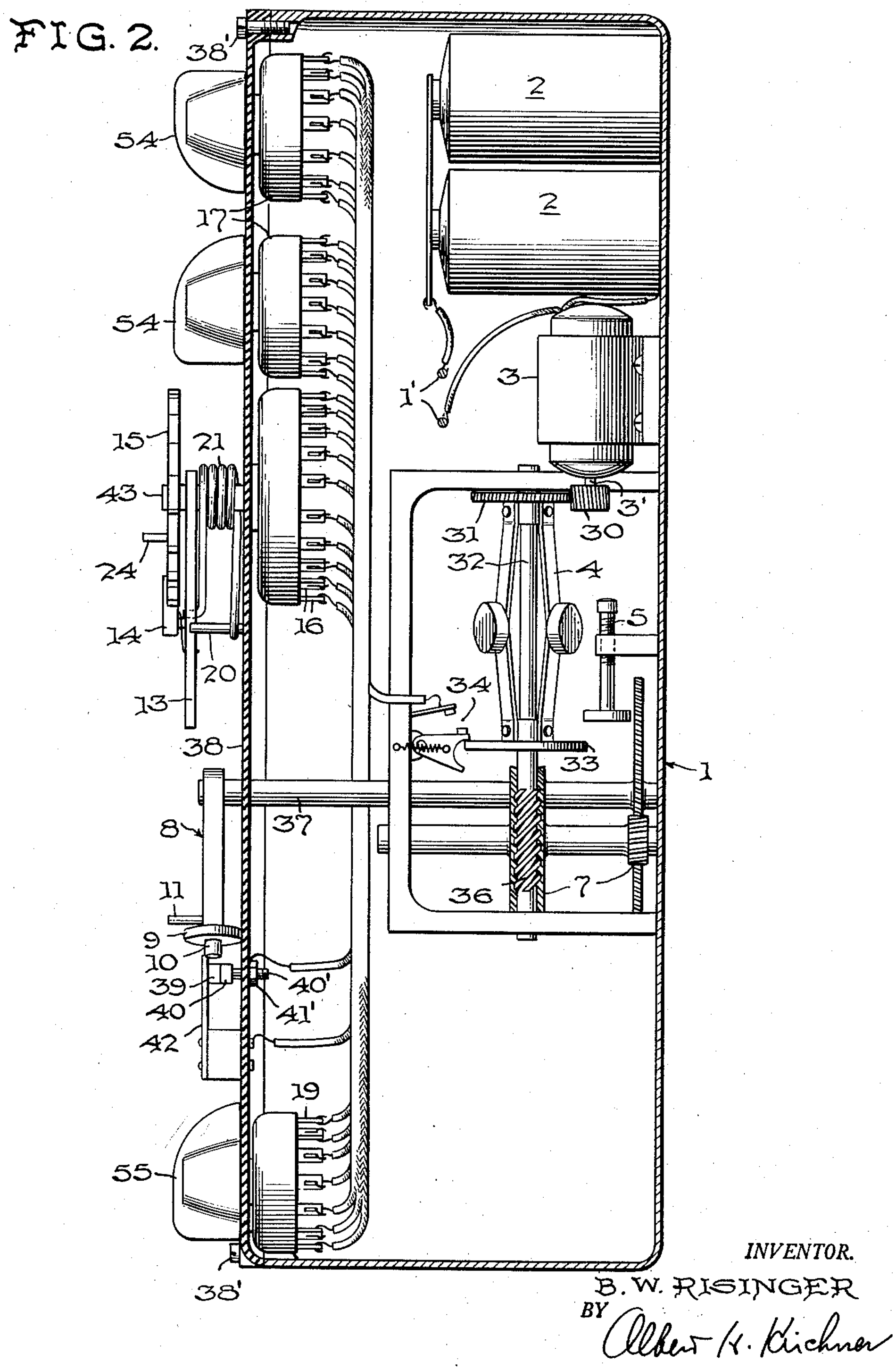
Figure 2 is a vertical section through the housing of Figure 1, taken along the lines 2—2 thereof, and indicating the manner in which the various operating parts of the device are compactly arranged therein.

By referring to the drawings and particularly Figure 1, it will be observed that the signaling apparatus of the invention is contained within a housing 1. Affixed to one portion of the housing 1 is a pair of terminals 1', which can be conveniently connected across any existing alarm system or temperature responsive device such as a thermostat which, upon actuation, will operate to close the circuit to the batteries 2 located within the housing or box 1, thereby causing energization of a motor 3 which also is connected to the batteries. The shaft 3' of the motor 3 has a pinion 30 affixed thereto, which meshes with gear 31, affixed to the shaft 32, for a centrifugal governor 4, which also includes as a part thereof a disc plate 33 for engaging and actuating the spring biased, toggle type master switch 34. An adjusting screw 5 may also be utilized, if desired, for regulating the speed and movements of the centrifugal governor 4 by mounting this screw in a proper position so that it may engage the disc plate 33 at a predetermined point.

One extremity of the governor shaft 32 is provided with a threaded portion 36 which connects the motor shaft 3' through a gear train 7 to a shaft 37 to which a master dialing arm 8 is also connected.

Dialing arm 8 is provided with a large interrupter roller 9, a small interrupter roller 10, and a ratchet actuating pin 11. Roller 9 is adapted to contact the face panel 38 of the housing 1 and serves to support the arm 8 on the face panel. Face panel 38 is made from any suitable dielectric material and it is fastened to the housing 1, by means of screws 38'. Roller 10 is adapted alternately to open and close the contact elements 39 and 40 which make up each of the fourteen contact points located on the face panel 38, ten of these contact points being used for the dialing operation and the other four points being used as code points. The operation of these contact points will be described hereinafter.

Contact elements 40 are securely attached to the face panel 38, and each of the contact elements 39 is affixed to the end of a leaf spring 42. Thus, as the arm 8 rotates and causes the contact elements 39 and 40 of the various contact points to be separated, they will automatically spring together when they become disengaged from the dialing arm 8. In the preferred embodiment of the invention it is contemplated that provision be made for varying the height of each of the contact elements 40, on face panel 38 so that the length of time, during which the circuit will be interrupted, in a manner to be more fully described hereinafter, by the separation of contact elements 39 and 40, can be accurately regulated. Accordingly each contact element 40 may be secured to face panel 38 by means of an adjustable screw 40' and a nut 41'.

Figure 3:
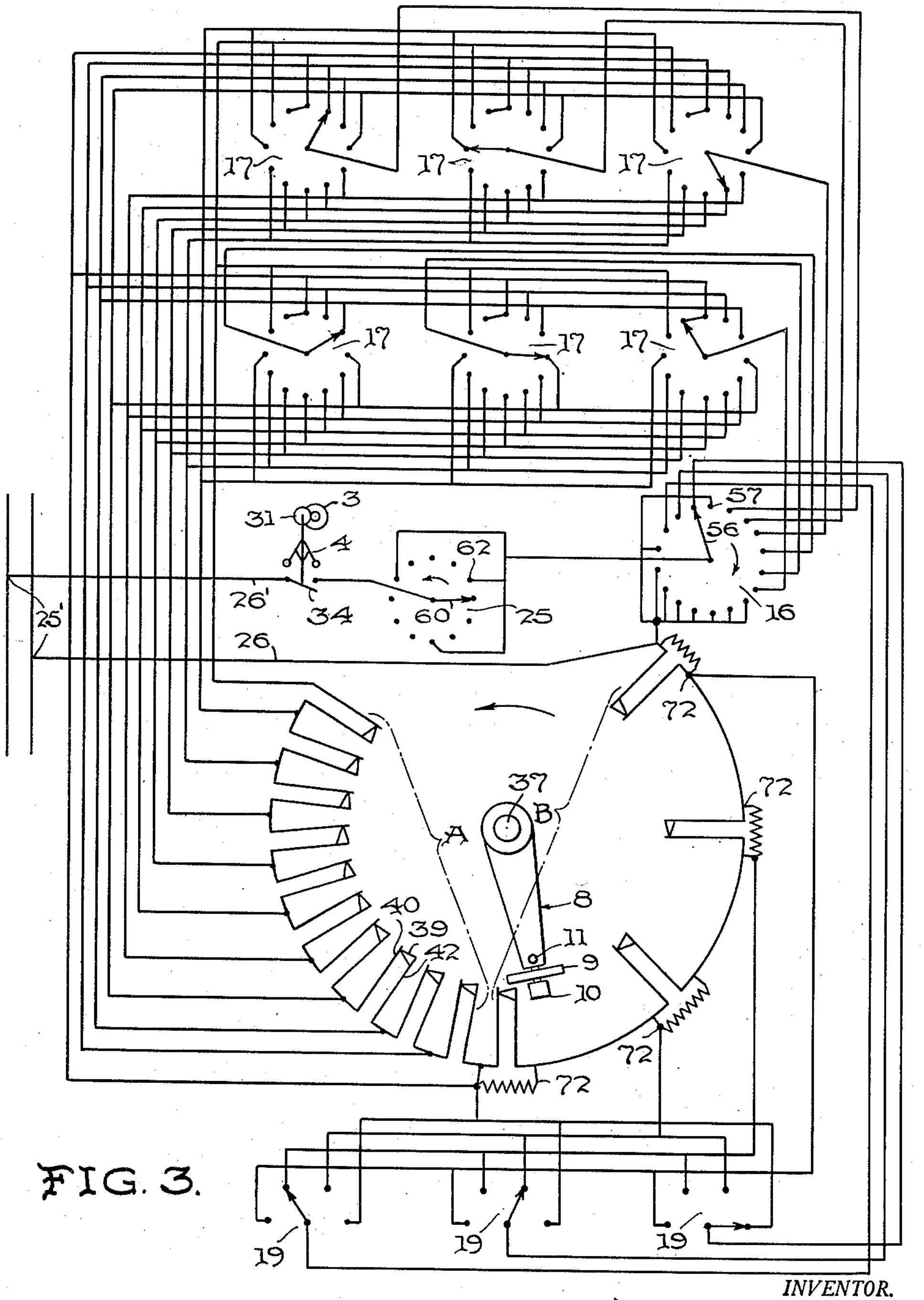
Figure 3 is a diagrammatic layout of a suitable electrical circuit which may be used with the signaling apparatus constituting the instant invention.

In addition, as arm 8 rotates, the pin 11 thereon will contact a lever 13 pivotally attached to shaft 43. A pawl 14 is pivotally and resiliently attached to lever 14. Pawl 14 is adapted to engage the teeth of the ratchet 15 also mounted on shaft 43, ratchet 15 being used to operate a rotary digit selector switch 16. For the purposes of illustration, switch 16 is shown in Figure 3, as being provided with a single inlet connection and eighteen outlets, and the ratchet 15 is accordingly provided with eighteen teeth corresponding to the eighteen outlets of the switch. Thus, for each rotation of the dialing arm 8, ratchet 15 will be moved one notch and will connect the inlet with each constructive outlet of the digit selector switch 16, A spring stop pin 20 and a spring 21 may also be used to return the lever 13 to its rest position after it is moved forward by arm 8.

Affixed to the upper surface of the ratchet 15 is a pin 24, which is employed to actuate the pawl 50 pivotally affixed to the arm 51, which arm in turn is mounted upon the shaft 52 for the ratchet 23 employed to actuate the rotary cycling selector switch 25. In the preferred embodiment of the invention it is contemplated that switches 25 and 16 be shorting type switches in order to prevent the circuit from becoming interrupted each time they are repositioned. This cycling selector switch 25, as indicated in Figure 3, is provided, for the purpose of illustration, with twelve positions, and the ratchet 23 is accordingly provided with twelve teeth. Ratchet 23 is moved one notch for each complete revolution of the actuating digit selector switch ratchet 15.

The control buttons 54 for a plurality of digit determining switches 17 are also mounted at the top of the face panel 38. Six of these switches are shown for the purposes of illustration, one being required for each digit in the phone number to be dialed. Each of these switches contains a common inlet connection and twelve outlet connections.

At the bottom of the face panel 38, a plurality of control buttons 55 are located. Three such buttons are shown for the purposes of illustration, each one of which is employed for actuating a code determining selector switch 19. Each of the rotary switches 19 is provided with one inlet terminal and four outlet terminals.

As indicated in Figures 1 and 3, a pair of terminals 25' for the wires 26 and 26' are also provided for connecting the automatic signaling device across a pair of telephone wires.

The operation of the automatic signaling device is as follows: When the alarm element or means is actuated, the elements of terminals 1' are connected and the circuit between the batteries 2 and the motor 3 is closed thereby energizing the motor 3.

Power from the motor 3 is in turn transmitted first to the centrifugal governor 4, which operates to cause the closing of master switch 34 in line 26' leading from the telephone lines via one of the terminals 25' to cycling selector switch 25 and then through gear train 7 and shaft 37 to the dialing arm 8, which then commences to rotate on the face plate 38. As arm 8 rotates, it successively opens and closes each of the contact elements making up the several contact points. As stated before, there are fourteen contact points, ten of which are employed for dialing operations. These may be termed the contact points of group A. The other four are utilized for sending coded message to the central receiving station. These may be classified as group B contact points (see Fig. 3). Each of the contact points in group B is connected to a separate resistor element 72, and these contact points, when engaged by roller 10 of arm 8, put their associated resistor elements in circuit at predetermined times and cause an audible click in the receiver at the receiving station in a manner to be more fully described hereinafter, so as to send a coded message to the receiving station.

With switch 34 closed and arm 8 rotating, lever arm 13 will be moved, thereby actuating pawl 14, which then moves ratchet 15 one notch, ratchet 15 being initially set so that upon the first rotation of arm 8, the contact arm 56 of switch 16 contacts the first outlet 57 of the switch. At the same time pawl 50 is advanced one notch by pin 24 on ratchet 15 as the latter is moved. Pawl 50 then operates to move ratchet 23 of the cycling selector switch 25 so that the contact arm 60 thereof moves one notch to engage the first outlet 62. The signaling device is thus connected to the telephone circuit through lines 26, 26' and switches 25 and 16 and the signaling device is then ready to begin dialing the number of the receiving station.

This is accomplished as the master dialing arm 8 continues to rotate and with each rotation advances ratchet 15 and its contact arm 56 one notch. In advancing one notch at a time, each of the succeeding six contact points of the selector switch 16 is successively connected to each of the several digit determining switches 17. In order to dial a phone number in a conventional dialing system, it is only necessary to make and break the circuit a number of times corresponding to the digits required, assuming of course there is a proper timing between breaks in the circuit, a proper duration of the breaks and provided also a minimum pausing time occurs between the dialing of the digits. For the purposes of illustrating the present invention, the digit determining switches 17 have been set so that the number to be called is 1952–3, as shown in Figure 1.

Also, since contact arm 60 of switch 25 will move but one notch during the time the arm 56 of switch 16 move s eighteen notches, the dialing action will take place without interruption after outlet 62 has been contacted, closing the circuit to the telephone lines, and arm 56 of switch 16 has moved to the next outlet of switch 16 leading to the first digit determining switch 17 which is set at the numeral 1. The telephone circuit at this time is completed through terminals 25', lines 26 and 26', and switches 25 and 16, the first digit determining switch 17 and through the contact points of groups A and B. During this period, arm 8 continues to rotate and as it opens the last contact point of group A to which the first digit determining switch is connected, it causes one interruption in the circuit, which corresponds to the number 1.

As the dialing action proceeds and ratchet 15 moves another notch, selector arm 56 of switch 16 will move to the next outlet and the circuit is again completed via terminals 25', lines 26 and 26', switches 25, 16, and the next digit determining switch which is set to the numeral 9. At this time, arm 8, as it rotates, will cause interruption of the circuit nine times because the second digit determining switch is connected to the ninth contact point of group A. A similar action continues for each succeeding numeral until the entire number is dialed, as the several digit determining switches keep succeeding each other. Since there is no last digit to be dialed in accordance with the predetermined setting of the last digit determining switch, only the resistors 72 will be put in the circuit as the dialing arm 8 opens and closes the contact points and the circuit will be maintained without interruption.

Once the number is called and the receiving phone continues to ring or is picked up, silence is experience until ratchet 15 has been advanced by dialing arm 8 and pawl 14 nine more notches and the last three outlets of switch 16 are reached and successively contacted by contact arm 56. As these outlets are successively contacted, each of which leads to a separate code determining selector switch 19, the resistors 72 will be flashed across the telephone circuit and produce an audible click in the circuit so as to send a predetermined coded message to the receiving station.

For the purposes of illustration and as indicated in Figures 1 and 3, these resistors 72 will be flashed across the circuit in the following manner: When the first of the last three outlets of switch 16 is contacted, the first code determining switch 19 is put in circuit. The first code determining switch 19 is set at 2. Thus, the last two contact points in group B will be interrupted by the dialing arm 8 as it rotates and two audible clicks will be heard on the receiving end of the line.

When the next outlet of switch 16 is contacted, the next code determining switch will be placed in circuit. This switch is set at 3 and as arm 8 rotates it will interrupt the last three of the contact points of group B and three audible clicks will be heard at the other end of the line.

When the next and final outlet of the switch 16 is contacted by arm 56, all the resistors will be flashed across the circuit in the manner previously described and four audible clicks will be heard.

For the next three completer rotations of the ratchet 15, the circuit is broken because the cycling switch 25 will be cut out since arm 60 of switch 25 is moved to non circuit contacting outlets. Then the cycle recited above will again take place and the dialing and code sending operations are repeated until the batteries run down and the motor is no longer able to maintain proper speed for the governor to hold switch 34 in a closed position.

A preferred embodiment of the invention has been herein disclosed. Various changes and modifications may be made in the illustrated structure without departing from the spirit of the invention or the scope of the appended claims.

What is claimed is:

1. In a device of the character described, an automatic telephone circuit, a plurality of successive groups of contact points, actuating digit selector switch means, a plurality of individually adjustable digit determining switches connected to one of said groups of contact points and common means for actuating and connecting said selector switch means and successive digit determining switches to said telephone circuit and for simultaneously opening and closing the individual contact points in one of said groups of contact points connected to the said digit determining switches and thereafter the individual contact points in another group of contact points in a prearranged manner, whereby the number of a receiving station will be dialed and thereafter a coded message transmitted over said telephone circuit to said receiving station.

2. In an alarm signal apparatus for use in conjunction with an automatic telephone circuit, the combination of a digit selector switch, a plurality of individually adjustable digit determining switches, a cycling selector switch, a plurality of successive groups of contact points, one of said groups of contact points being connected to said digit determining switches, and common power means for operating and connecting each of said switches and said contact points successively across the telephone circuit in a prearranged manner whereby the number of a receiving station will be dialed and thereafter a coded message transmitted to said receiving station.

3. In a device of the character described, an automatic telephone circuit, adjustable digit determining switch means, cycling switch means, actuating digit selector switch means, a plurality of successive groups of contact points, one of said groups of contact points being connected to said digit determining switch means, resistor means associated with another of said groups of contact points, means for connecting successive groups of contact points and all of said switch means across said telephone circuit and for simultaneously opening and then closing successive contact points in said successive groups of contact points whereby said telephone circuit will be first interrupted a predetermined number of times and said resistor means will be then flashed across said circuit so as to bring about the dialing of a receiving station and thereafter the transmission of a coded message to said receiving station.

4. In a device of the character described, an automatic telephone circuit, a plurality of individually adjustable digit determining switches, a cycling switch, an actuating digit selector switch, a plurality of groups of contact points successively arranged, one of said groups of contact points being connected to said digit determining switches, resistor means associated with another of said groups of contact points, means for connecting said groups of contact points, said cycling switch and said selector switch and contemporaneously successive digit determining switches to said telephone circuit, and means including an interrupter arm for alternately opening and closing said contact points in said successive groups of contact points at predetermined times while said switches and said groups of contact points are successively connected to said telephone circuit so as to bring about the dialing of a receiving station and thereafter the transmission of a coded message to said receiving station.

5. In a device of the character described, an automatic telephone circuit, a plurality of individually adjustable digit determining switches, an actuating digit selector switch, a plurality of contact points arranged in successive groups, one of said groups of contact points being connected to said digit determining switches, resistor means associated with another of said groups of contact points, a rotatable interrupter arm for alternately opening and closing the contact points in said successive groups of contact points in a prearranged sequence, and common means for actuating said interrupter arm and for simultaneously connecting said switches and successive groups of contact points to said telephone circuit, whereby the number of a receiving station may be dialed and thereafter a coded message transmitted to said receiving station.

6. In an alarm signal apparatus for use in conjunction with an automatic telephone circuit, the combination of a digit selector switch, ratchet means for operating said switch, a plurality of individually adjustable digit determining switches, a plurality of contact points arranged in successive groups, one of said groups of contact points being connected to said digit determining switches, resistor means associated with another of said groups of contact points, a rotatable interrupter arm for alternately opening and closing the contact points in said groups of contact points in a predetermined sequence and for cyclically actuating said ratchet means, power means for operating said interrupter arm and in turn said ratchet means for said digit selector switch and means for simultaneously connecting said digit selector switch and successive digit determining switches and contact points to said telephone circuit during rotation of said interrupter arm, whereby the number of the receiving station may be dialed and thereafter a coded message transmitted to said receiving station.

7. The combination of claim 6 including means for controlling the speed of said interrupter arm.

8. The combination of claim 6 including a master switch and a centrifugal governor for operating said master switch, said governor also being connected to said power means.

9. In an alarm signal apparatus for use in conjunction with an automatic telephone circuit, the combination of a digit selector switch, ratchet means for operating said switch, a plurality of contact points arranged in successive groups, a plurality of digit determining switches connected to one of said groups of contact points, resistor means associated with another of said groups of contact points, each of said digit determining switches also being individually adjustable to a predetermined numerical setting, a cycling switch, ratchet means for operating said cycling switch, said second ratchet means being actuated in turn directly by said first ratchet means, a rotatable interrupter arm for alternately opening and closing the contact points in said groups of contact points in a predetermined sequence and for cyclically actuating said first mentioned ratchet means, power means for operating said interrupter arm and means for simultaneously connecting said digit selector switch, said cycling switch and successive digit determining switches and contact points to said telephone circuit during rotation of said interrupter arm, whereby the telephone circuit may be interrupted a predetermined number of times at successive intervals so that the number of a receiving station may be dialed and thereafter a predetermined number of resistor elements may be flashed across the circuit at successive intervals of time so that a predetermined number of successive audible clicks forming a coded message may then be heard at the receiving station.

10. The combination of claim 9 including a master switch and a centrifugal governor for operating said master switch, said governor also being connected to said power means.

11. The combination of claim 9 including means for controlling the speed of said interrupter arm.

12. In an alarm signal apparatus for use in conjunction with an automatic telephone circuit, the combination of a digit selector switch, ratchet means for operating said switch, a plurality of contact points arranged in successive groups, a plurality of digit determining switches connected to one of said groups of contact points, resistor elements associated with at least one of said groups of contact points, each of said digit determining switches also being individually adjustable to a predetermined numerical setting, a cycling switch, ratchet means for operating said cycling switch, said second ratchet means in turn being directly actuated by said first ratchet means, a rotatable interrupter arm for alternately opening and closing the contact points in said groups of contact points in a predetermined sequence and for cyclically actuating said first mentioned ratchet means, motor means for operating said interrupter arm, a centrifugal governor for said motor means, means for simultaneously connecting said digit selector switch and successive digit determining switches and contact points to said telephone circuit during rotation of said interrupter arm, whereby the telephone circuit may be interrupted a predetermined number of times at successive intervals so that the number of a receiving station may be dialed and thereafter a predetermined number of resistor elements may be flashed across the circuit at successive intervals of time so that a predetermined number of audible clicks forming a coded message may be heard at successive intervals of time at the receiving station, and a master switch also controlled by said centrifugal governor for connecting all of said switches and said contact points to said telephone circuit.

References Cited in the file of this patent

UNITED STATES PATENTS

| | | |
|---|---|---|
| 515,110 | Callender | Feb. 10, 1894 |
| 958,719 | Bronson | May 24, 1910 |
| 1,217,241 | Tracy | Feb. 27, 1917 |
| 1,864,074 | Krum | June 21, 1932 |
| 1,972,289 | Chauveau | Sept. 4, 1934 |
| 2,088,002 | Scott | July 27, 1937 |
| 2,116,372 | Weld | May 3, 1938 |
| 2,152,151 | Phillips et al. | Mar. 28, 1939 |
| 2,159,650 | Alker | May 23, 1939 |
| 2,478,514 | Townley | Aug. 9, 1949 |